(12) United States Patent
Murakami et al.

(10) Patent No.: US 10,314,140 B2
(45) Date of Patent: Jun. 4, 2019

(54) LIGHTING CONTROL DEVICE

(71) Applicant: Panasonic Intellectual Property Management Co., Ltd., Osaka (JP)

(72) Inventors: Yoshinobu Murakami, Osaka (JP); Atsuo Nanahara, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/605,422

(22) Filed: May 25, 2017

(65) Prior Publication Data
US 2017/0347428 A1 Nov. 30, 2017

(30) Foreign Application Priority Data
May 30, 2016 (JP) .................................. 2016-107360

(51) Int. Cl.
*H05B 37/02* (2006.01)
*H05B 33/08* (2006.01)

(52) U.S. Cl.
CPC ..... *H05B 37/0218* (2013.01); *H05B 33/0854* (2013.01); *H05B 37/0245* (2013.01);
(Continued)

(58) Field of Classification Search
CPC .... F21K 9/00; F21S 2/005; F21S 8/04; F21V 14/02; F21V 15/01; F21V 21/15; F21V 21/30; F21V 29/60; F21V 29/74; F21V 29/763; G01J 1/0219; G01J 1/0228; G01J 1/0247; G01J 1/44; G01K 1/024; G01K 1/045; G01K 1/08; G08C 19/28; G09G 3/342; H05B 33/0818; H05B 33/0842; H05B 33/0845; H05B 33/0851;
(Continued)

(56) References Cited

U.S. PATENT DOCUMENTS 9,220,153 B2 * 12/2015 Pan .................... H05B 37/02
2013/0141018 A1 * 6/2013 Kamii ............... H05B 33/0863
315/360

FOREIGN PATENT DOCUMENTS

JP H10-302968 A 11/1998
JP 2003-243186 A 8/2003
(Continued)

*Primary Examiner* — Seokjin Kim
(74) *Attorney, Agent, or Firm* — McDermott Will & Emery LLP

(57) ABSTRACT

A lighting control device that controls a lighting device includes: a brightness sensor that obtains brightness information indicating a current brightness of an illuminated surface; a storage that stores a brightness target value for the illuminated surface; a controller; a receiver via which the controller receives an energy-saving signal; and a transmitter that transmits, to the lighting device, a control signal generated by the controller. When the energy-saving signal is not being received, the controller determines a dimming rate for the lighting device based on the brightness target value and the brightness information. When the energy-saving signal is being received, the controller determines an energy-saving brightness target value smaller than the brightness target value by multiplying the brightness target value by a predetermined rate and determines an energy-saving dimming rate for the lighting device based on the energy-saving brightness target value and the brightness information.

8 Claims, 8 Drawing Sheets

(52) U.S. Cl.
CPC .......... *H05B 37/0272* (2013.01); *Y02B 20/40* (2013.01); *Y02B 20/46* (2013.01)

(58) Field of Classification Search
CPC ............ H05B 33/0854; H05B 33/0857; H05B 33/086; H05B 33/0863; H05B 33/0866; H05B 33/0869; H05B 33/0872; H05B 37/02; H05B 37/0209; H05B 37/0218; H05B 37/0227; H05B 37/0245; H05B 37/0254; H05B 37/0272; H05B 37/0281; H05B 37/029; H05B 39/086; H05B 41/3922; Y02B 20/40; Y02B 20/46
See application file for complete search history.

(56) References Cited

FOREIGN PATENT DOCUMENTS

| | | |
|---|---|---|
| JP | 2004-180411 A | 6/2004 |
| JP | 2012-074150 A | 4/2012 |
| JP | 2014-183034 A | 9/2014 |
| JP | 2014-229455 A | 12/2014 |

\* cited by examiner

FIG. 5A

| CONTROL TYPE | DIMMING RATE |
|---|---|
| DEMAND CONTROL | 80% |

FIG. 5B

| CONTROL TYPE | LOCATION | DIMMING RATE |
|---|---|---|
| SCENE CONTROL A | CONFERENCE ROOM A | 70% |
| SCENE CONTROL B | CONFERENCE ROOM B | 65% |

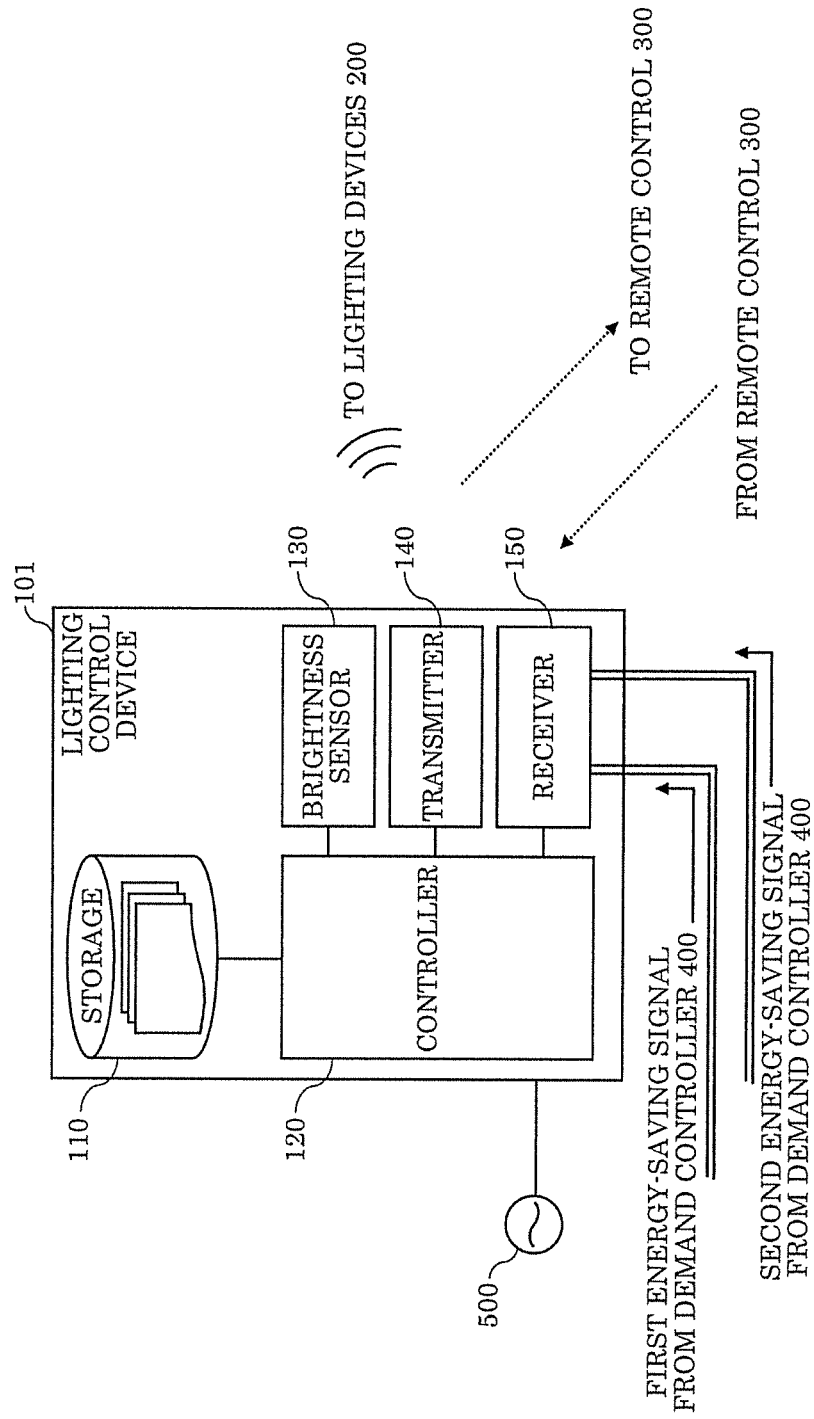

FIG. 8

| CONTROL TYPE | DIMMING RATE | PRIORITY |
|---|---|---|
| DEMAND CONTROL A | 80% | 2 |
| DEMAND CONTROL B | 70% | 1 |

LIGHTING CONTROL DEVICE

CROSS REFERENCE TO RELATED APPLICATION

This application claims the benefit of priority of Japanese Patent Application Number 2016-107360 filed on May 30, 2016, the entire content of which is hereby incorporated by reference.

BACKGROUND

1. Technical Field

The present disclosure relates to a lighting control device that executes feedback control on an output of a lighting device based on the measured brightness of an illuminated surface.

2. Description of the Related Art

A lighting apparatus configured to execute feedback control on an output (dimming rate) of a lighting device based on the measured brightness of an illuminated surface has been proposed (for example, see Japanese Unexamined Patent Application Publication No. H10-302968). Such a lighting apparatus inhibits the output of the lighting device to conserve energy by maintaining the brightness of the area to be illuminated to within a certain range while making use of the brightness provided by daylight entering the room from, for example, a window.

Moreover, one known example of a device that executes control for changing the output of a lighting device is a demand controller that monitors power usage at a consumer location and inhibits the power usage by preventing power usage from exceeding a predetermined setting in a given period (for example, see Japanese Unexamined Patent Application Publication No. 2004-180411). Such a demand controller is used for keeping maximum power usage at the consumer location from exceeding the contract power stipulated in contract with the power company.

SUMMARY

Under control by the above demand controller, when an instruction for execution of demand control (more specifically, energy-saving light emission) from the demand controller is given, the lighting device dimming rate is changed to a value set in advance. For example, when the dimming rate for energy-saving light emission is set to 70%, the dimming rate for the lighting device when the lighting device is receiving the instruction to execute energy-saving light emission is changed to 70% regardless of the dimming rate up until that point.

However, in the above lighting apparatus, when such control by the demand controller is executed while the output of the lighting device is already being inhibited by feedback control, the dimming rate of the lighting device increases, which may have the opposite effect of increasing power consumption.

A lighting control device according to one aspect of the present invention controls a lighting device and includes: a brightness sensor that obtains brightness information indicating a current brightness of an illuminated surface illuminated by the lighting device; a storage that stores a brightness target value for the illuminated surface; a controller that obtains the brightness information from the brightness sensor and the brightness target value from the storage; a receiver via which the controller receives, from an external source, an energy-saving signal instructing execution of energy-saving light emission by the lighting device; and a transmitter that transmits, to the lighting device, a control signal generated by the controller for controlling the lighting device, wherein: when the energy-saving signal is not being received, the controller determines a dimming rate for the lighting device based on the brightness target value obtained from the storage and the brightness information, and transmits, to the lighting device via the transmitter, the control signal indicating the dimming rate, and when the energy-saving signal is being received, the controller determines an energy-saving brightness target value by multiplying the brightness target value obtained from the storage by a predetermined rate and determines an energy-saving dimming rate for the lighting device based on the energy-saving brightness target value and the brightness information, the energy-saving brightness target value being smaller than the brightness target value obtained from the storage, and transmits, to the lighting device via the transmitter, the control signal indicating the energy-saving dimming rate.

The lighting control device according to one aspect of the present invention is capable of demonstrably conserving power without increasing the output of the lighting device even when the demand controller is applying demand control to a lighting device whose output is being inhibited by feedback control.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5A illustrates, in the lighting control device according to the embodiment, an example of the data structure of the dimming rate set in association with an energy-saving signal from a demand controller;

FIG. 5B illustrates, in the lighting control device according to the embodiment, an example of the data structure of the dimming rate set in association with a first operation signal from a remote control;

FIG. 6 is a block diagram illustrating an example of the functional configuration of a lighting control device according to a variation of the embodiment;

FIG. 8 illustrates, in the lighting control device according to the variation of the embodiment, an example of the data structure of the dimming rate set in association with an energy-saving signal from a demand controller.

DETAILED DESCRIPTION OF THE EMBODIMENT

Figure 1:
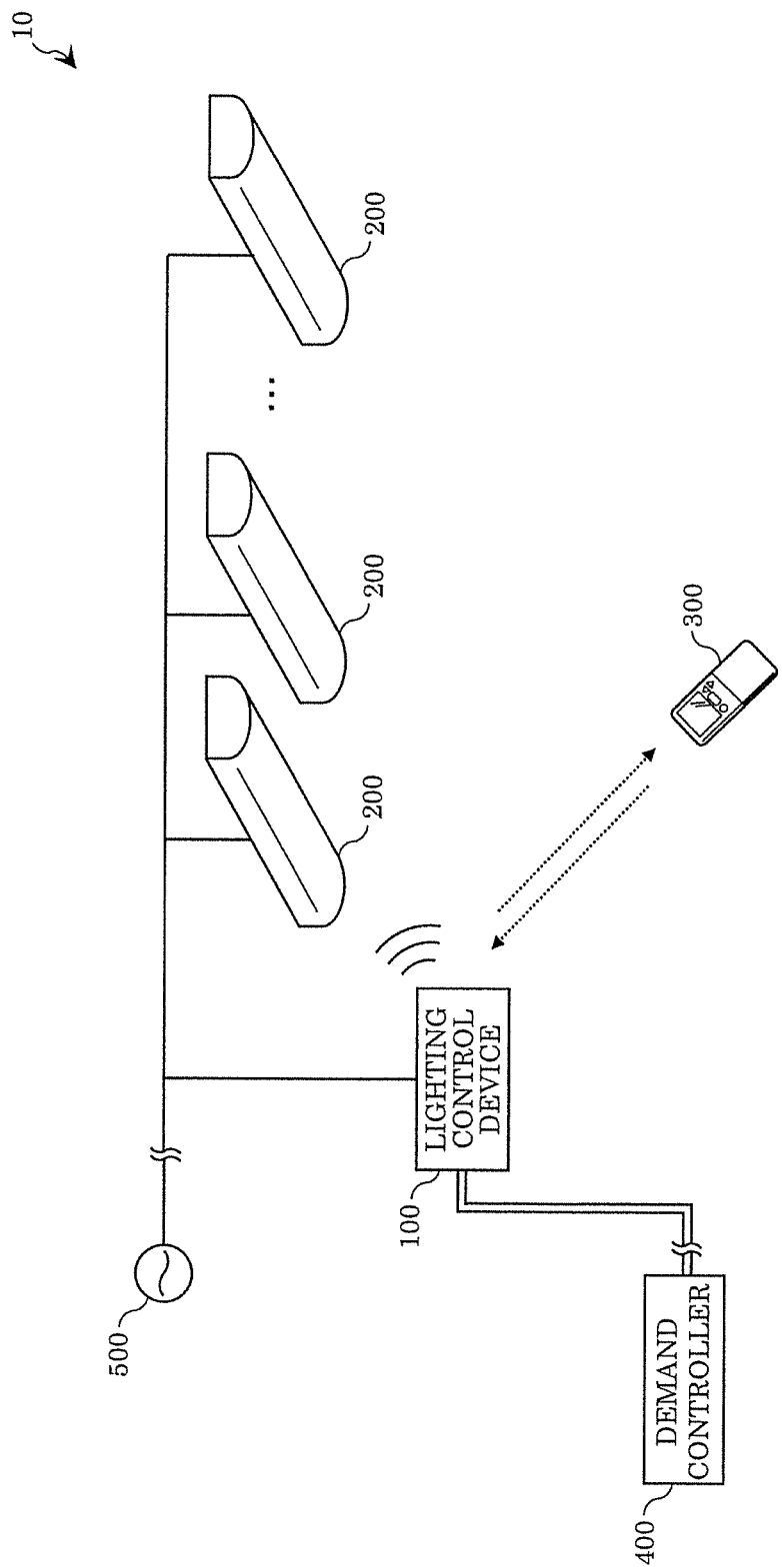
FIG. 1 illustrates an example of a configuration of a lighting system including a lighting control device according to an embodiment.

The following describes an embodiment of the present disclosure with reference to the drawings. Note that the embodiment described below shows a specific example of the present disclosure. The numerical values, shapes, materials, elements, the arrangement and connection of the elements, etc., indicated in the following embodiment are mere examples, and therefore do not intend to limit the inventive concept. Therefore, among elements in the following embodiment, those not recited in any of the independent claims defining the most generic part of the inventive concept are described as optional elements.

Note that the drawings are represented schematically and are not necessarily precise illustrations. Further, like reference signs in the drawings indicate like elements. As such, overlapping explanations of like elements are omitted or simplified.

Embodiment

Hereinafter, a lighting control device according to an embodiment will be described.
(1. Configuration)
(1-1. Lighting System Configuration)

First, in order to summarize the role of the lighting control device according to this embodiment in the consumer location, the configuration of the lighting system including the lighting control device will be described. FIG. 1 illustrates an example of a configuration of lighting system 10 including lighting control device 100 according to the embodiment.

Lighting system 10 is installed in an energy consumer location, such as a place of business, and includes, in addition to lighting control device 100, lighting devices 200, remote control 300, demand controller 400, and power supply 500.

Power supply 500 is an AC utility power supply. Lighting control device 100, lighting devices 200, and demand controller 400 operate off power received from power supply 500.

Lighting control device 100 controls the turning on and off of lighting devices 200, as well as the output (dimming rate: where 100% indicates maximum output and 0% indicates zero output) of lighting devices 200 when lighting devices 200 are on, in accordance with instructions from remote control 300 and demand controller 400.

Lighting control device 100 also obtains information indicating a level of brightness (hereinafter also referred to as brightness information) from a sensor that measures the brightness of a surface illuminated by lighting devices 200, and performs feedback control on the output of lighting devices 200 based on the brightness information. In the example illustrated in FIG. 1, a signal for performing this control is wirelessly transmitted to each lighting device 200 over radio waves in a predetermined frequency band as a transmission medium. Feedback control based on the brightness information will be described after the configuration of lighting control device 100 is described in detail.

Lighting devices 200 are installed in, for example, the ceiling of a building, such as a place of business, in the consumer location. In the example illustrated in FIG. 1, lighting system 10 includes a plurality of lighting devices 200. Each lighting device 200 includes a light source (not illustrated in the drawings) and a transmitter (not illustrated in the drawings) for wirelessly communicating with lighting control device 100.

The light source in each lighting device 200 is, for example, a light-emitting diode (LED) light source. The output of the light source is variable via pulse width modification (i.e., the light source is dimmable). In the example illustrated in FIG. 1, the dimming of all lighting devices 200 is controlled by a single lighting control device 100.

Remote control 300 is a device operated by a user to switch lighting devices 200 on or off and adjust the brightness of lighting devices 200. When the user operates remote control 300, a signal based on this operation (hereinafter also referred to as an operation signal) is transmitted from remote control 300 to lighting control device 100. Remote control 300 may also be used for setting various parameters in lighting system 10 by, for example, a user or the installer who installs lighting system 10 in the consumer location. For example, remote control 300 may be used for pairing lighting control device 100 and lighting devices 200 for communication purposes. This sort of remote control 300 can be realized as, for example, an infrared remote control that communicates with lighting control device 100 using infrared light as a medium.

Demand controller 400 is a device installed in, for example, a power receiving facility in the consumer location, and is for monitoring power usage in the consumer location in real-time. When power usage is estimated to exceed a predetermined value, demand controller 400 inputs, into lighting control device 100, a signal instructing execution of energy-saving light emission by lighting devices 200 (hereinafter, this signal is also referred to as an energy-saving signal). Demand controller 400 may receive a signal demanding conservation of power via a communication network from outside lighting system 10, e.g., from the power company, and may input the energy-saving signal into lighting control device 100 in accordance with this demand.

The configuration of lighting system 10 set forth above is merely one example; possible configurations for the lighting system that can include lighting control device 100 according to this embodiment are not limited to this example.

For example, remote control 300 may communicate with lighting control device 100 via a wireless system that uses a communication medium other than infrared light. For example, a communication system conforming to some standard, such as Bluetooth (registered trademark) or ZigBee (registered trademark), may be used. Moreover, remote control 300 need not be a portable device as illustrated in FIG. 1; remote control 300 may be fixed to a wall and may communicate with lighting control device 100 over a wired connection. Moreover, both wired and wireless communication may be performed in lighting system 10. Moreover, when lighting system 10 includes a plurality of remote controls 300, the plurality of remote controls 300 may have different functions and the number of lighting devices 200 that are selectable as candidates for control may be different. Remote controller 300 may be a part of lighting control device 100.

Moreover, the light source included in each lighting device 200 is not limited to an LED light source. For example, the light source may be some other type of light source that is dimmable, such as an organic electroluminescent (EL) light source. Moreover, the method of controlling the output of the light source is not limited to the example of pulse width modification given above; methods suitable for various light sources may be used.

(1-2. Lighting Control Device Configuration)

Figure 2:
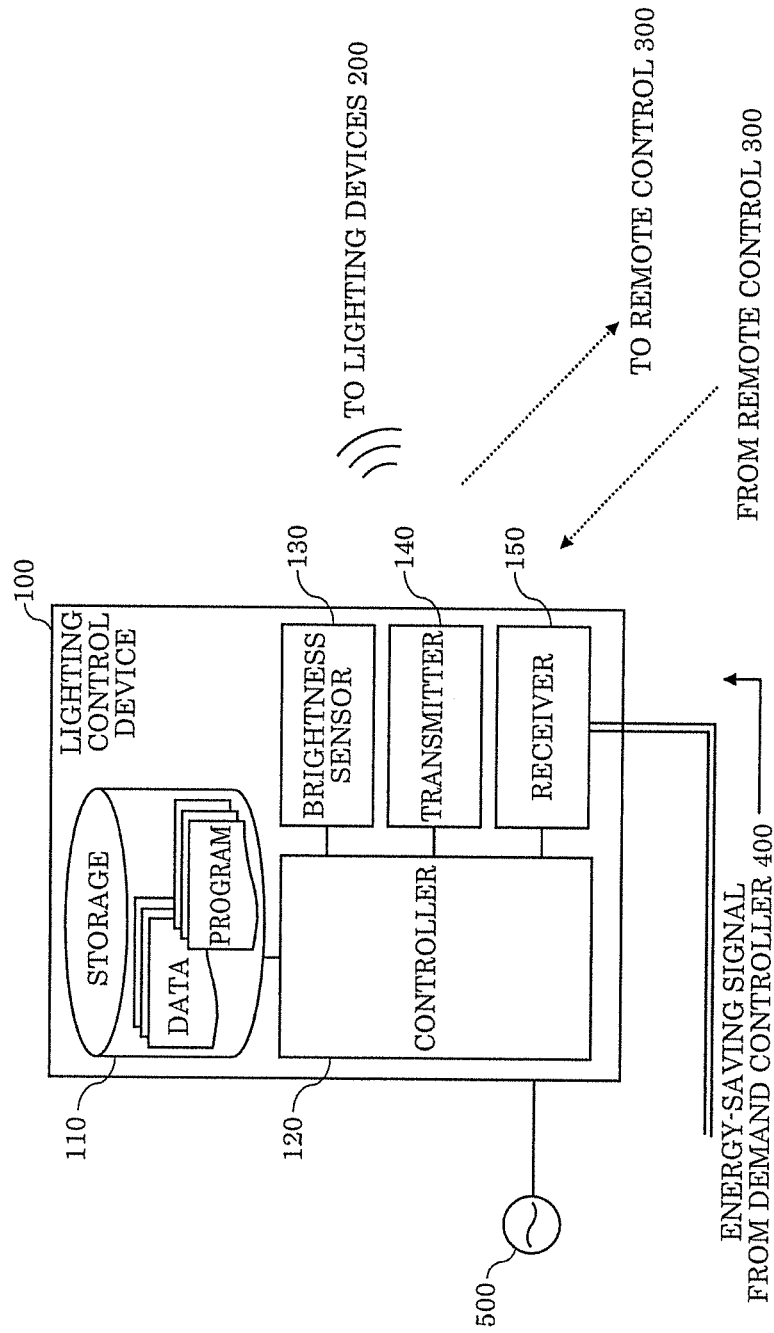
FIG. 2 is a block diagram illustrating an example of the functional configuration of the lighting control device according to the embodiment.

Next, the configuration of lighting control device 100 according to this embodiment will be described. FIG. 2 is a block diagram illustrating an example of the functional configuration of lighting control device 100 according to this embodiment.

Lighting control device 100 includes storage 110, controller 120, brightness sensor 130, transmitter 140, and receiver 150.

Storage 110 stores a program to be executed by controller 120, which is to be described later, and data obtained and referenced for predetermined processing performed by controller 120 executing the program. An example of such data is data indicating the settings set in lighting system 10. Moreover, the brightness target value, which is used in the feedback control for lighting device 200 performed in lighting system 10, is also stored in storage 110 and is also data obtained and referenced by controller 120. Moreover, data generated during or as a result of processes performed by controller 120 is stored in storage 110 as necessary. Storage 110 is realized as, for example, read-only memory (ROM) and random access memory (RAM) in a microcontroller included in lighting control device 100.

Controller 120 reads the above program from storage 110 and executes the program to generate a signal for controlling lighting devices 200 (hereinafter also referred to as a control signal). For example, controller 120 generates the control signal by outputting a signal indicating the results of calculations made by running the above program. Alternatively, the control signal may be generated by outputting a signal indicating a command selected from data stored in storage 110 in accordance with the program. The generated control signal is transmitted to each lighting device 200 via transmitter 140, which will be described later. This control of lighting devices 200 is executed by controller 120 based on the above-described data stored in storage 110 or information and signals obtained from brightness sensor 130 or receiver 150. This control will be described later in conjunction with the description of operations performed by lighting control device 100. Controller 120 is realized as, for example, a processor of a microcontroller included in lighting control device 100.

Brightness sensor 130 obtains the current brightness of the surface of an object (illuminated surface), such as the floor or furniture, in an area illuminated by light from lighting devices 200, and successively transmits the obtained brightness to controller 120. More specifically, brightness sensor 130 is realized using a sensor, such as a light sensor that converts light into electricity, and senses light reflected from, for example, the floor or the top of a desk in the area illuminated by lighting device 200 and converts the light into voltage in accordance with the intensity of the light. A signal based on the value of this voltage is input into controller 120. A signal based on a voltage value is, for example, a signal that has been processed as necessary. Examples of such processing include amplification, noise removal, and A/D conversion. Note that in order to perform such processing, brightness sensor 130 may include, for example, an amplifier circuit, a filter circuit, and/or an A/D converter circuit. In this way, brightness sensor 130 obtains and outputs brightness information indicating the current brightness of an illuminated surface, and controller 120 obtains this brightness information. Controller 120 controls the light output of lighting devices 200 in such a manner as to constantly maintain the brightness indicated in the brightness information. For example, when light originating from outside the system is incident on the illuminated surface, the dimming rate for lighting devices 200 is reduced (i.e., the light intensity is reduced) to a value less than when no such outside light is incident. Moreover, the dimming rate for lighting devices 200 is increased (i.e., the light intensity is increased) when, for example, it is cloudy and the intensity of outside light that reaches the illuminated surface is weak. In other words, brightness sensor 130 is an element that, in the feedback control described above obtains and outputs a control amount by detecting the current state.

The setting of the brightness target value used in the feedback control may be done using, for example, brightness sensor 130. More specifically, first, lighting devices 200 in a given room in a building in the consumer location are turned on when there is no influence from outside light (e.g., during nighttime). Next, the installer or user adjusts the dimming rate for lighting devices 200 using remote control 300, then sets the brightness target value when a desired brightness is achieved. At this time, the value indicating the brightness of the illuminated surface illuminated by lighting devices 200, which is measured and obtained by brightness sensor 130, is stored in storage 110 as the brightness target value. Brightness sensor 130 may be remotely arranged from lighting control device 100 and communicate with lighting control device 100 with a wired or a wireless communication.

Transmitter 140 is realized as, for example, an output port and wireless module of a microcontroller included in lighting control device 100, and wirelessly transmits a signal generated by controller 120 to lighting devices 200. Moreover, when remote control 300 is an infrared remote control as is the case in the above example, transmitter 140 may be realized using an infrared communication module. The current settings are transmitted from transmitter 140 to remote control 300 when, for example, lighting system 10 which uses remote control 300 is being set up.

Receiver 150 is, for example, an input port of a microcontroller included in lighting control device 100, and controller 120 receives, from demand controller 400—which is external to lighting control device 100—via receiver 150, an energy-saving signal which performs demand control, that is to say, which instructs execution of energy-saving light emission by lighting devices 200.

In lighting control device 100, whether to execute energy-saving light emission by lighting devices 200 is determined based on whether or not controller 120 is currently receiving the energy-saving signal. The energy-saving signal is input into lighting control device 100 by dry contact input, for example. In this case, for example, controller 120 detects the state of the contact input in a regular cycle via the input port, and when controller 120 detects an OFF state a predetermined number of consecutive times, controller 120 receives the energy-saving signal by determining that the energy-saving signal has been input. While detection of the OFF state continues, controller 120 continuously receives the energy-saving signal. Then, when the ON state is detected a predetermined number of consecutive times, controller 120 determines that there is no input of the energy-saving signal, whereby controller 120 enters a state in which it is not receiving the energy-saving signal.

Moreover, in the case of this example, the dimming rate used when controller 120 is receiving the energy-saving signal is not indicated by the energy-saving signal, but is stored in advance in storage 110 as a set value. This dimming rate may be set by, for example, the installer upon installing lighting system 10. Controller 120 obtains this dimming rate from storage 110, and executes control for energy-saving light emission by lighting devices 200 using the obtained dimming rate.

Moreover, a signal in accordance with an operation made on remote control 300 by the user or the installer is input from remote control 300 into controller 120 via receiver 150. Therefore, when remote control 300 is an infrared remote control as is the case in the above example, receiver 150 may be realized using an infrared communication module. The signal transmitted from remote control 300 indicates, for example, an instruction for turning on or off or adjusting the brightness of lighting devices 200. Moreover, when remote control 300 is used for setting the settings upon installing lighting system 10, the signal may indicate the content of the settings or an instruction related to the settings.

(2. Operations)

(2-1. Feedback Control System Operations)

Figure 3:
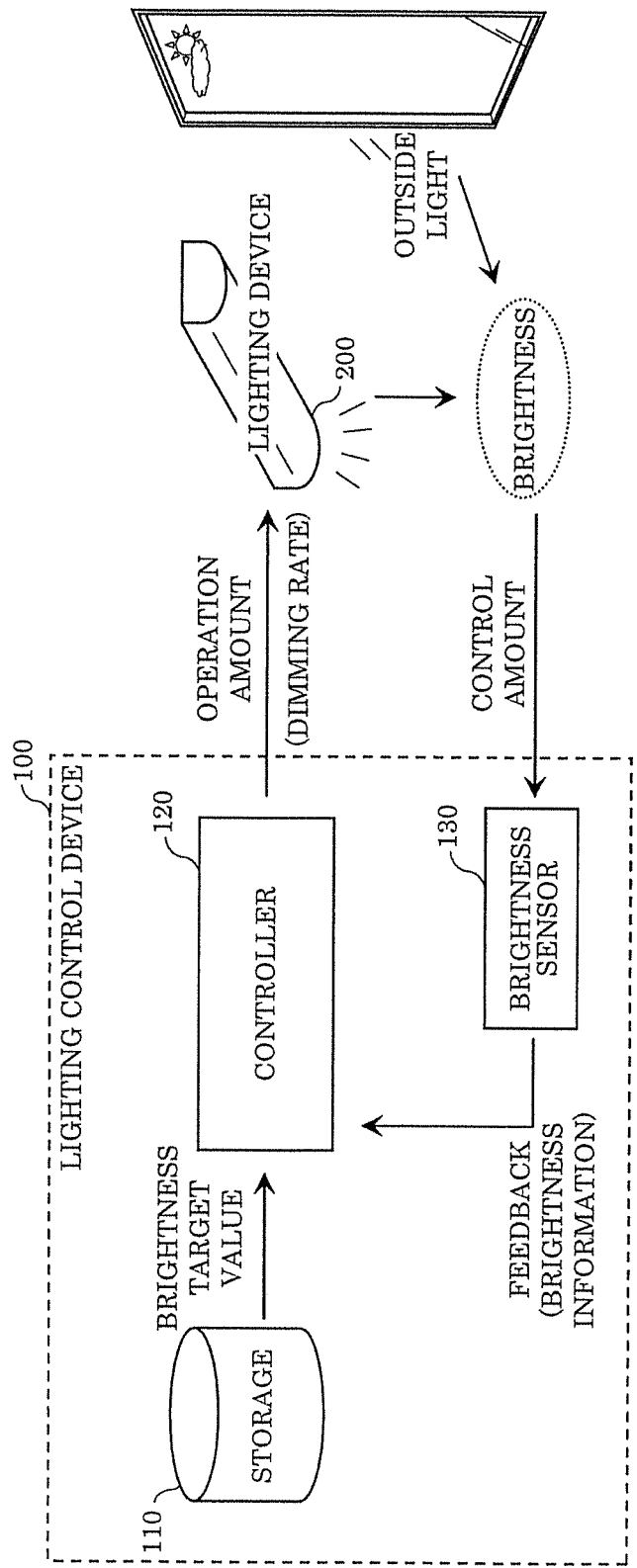
FIG. 3 is a block diagram illustrating an outline of operations relating to a feedback control system in the lighting system.

Hereinafter, operations relating to the feedback control system in lighting system 10 will be outlined with reference to FIG. 3. FIG. 3 is a block diagram illustrating an outline of operations relating to the feedback control system in lighting system 10. Operations relating to the feedback control system are performed by each above-described element in lighting control device 100 working in cooperation.

First, controller 120 obtains the brightness target value for the brightness of the area to be illuminated from storage 110, and obtains brightness information indicating the current measured brightness of the illuminated surface from brightness sensor 130. The brightness of the illuminated surface is the control amount used in the feedback control system. Moreover, this feedback control system is disturbed by, for example, outside light.

Next, controller 120 compares and calculates the difference between the brightness target value and the brightness indicated by the brightness information. When there is a difference, controller 120 determines a dimming rate that eliminates this difference, and transmits a control signal indicating this dimming rate to lighting device 200 to be controlled. The dimming rate is the operation amount used in the feedback control system.

Brightness sensor 130 regularly measures the brightness of the illuminated surface. Controller 120 obtains, from brightness sensor 130, the most recent brightness information after transmitting the control signal indicating the dimming rate, and once again performs the set of processes after the comparing.

In this way, controller 120 cyclically performs the determining of the dimming rate based on the brightness target value and the brightness information, as well as the transmitting of the determined dimming rate. As a result of these processes being repeatedly and continuously executed in lighting system 10 when in operation, the brightness of the illuminated surface is maintained at the brightness target value (or to within a margin of error from the brightness target value).

Outside light, which is a source of disruption, depends heavily on nature, and can therefore greatly vary in intensity, but, for example, so long as the cycle of operations from the obtainment to the transmission of the brightness information takes a short amount of time, such as a few seconds, changes large enough to be apparent to the user are not likely to occur within the span of one cycle. Therefore, the feedback control corrects the output of lighting device 200 by making layers of changes small enough to be unnoticeable by the user, in accordance with changes in the outside light.

Lighting control device 100 maintains the previous and subsequent brightness target values for the area to be illuminated to a substantially constant value by changing the output of lighting devices 200 so as to cancel out the intensity of the outside light. Moreover, lighting control device 100 saves energy by inhibiting the output of lighting devices 200 by using the outside light to maintain a constant brightness of the room.

Note that with lighting control device 100, in addition to the above described feedback control, control in accordance with a signal input from a device external to lighting control device 100, such as demand controller 400, is also performed on lighting devices 200. Next, operations centering around controller 120 performed in accordance with a signal input into lighting control device 100 from an external source will be described.

(2-2. Operations for Control Relative to External Signal)

Figure 4:
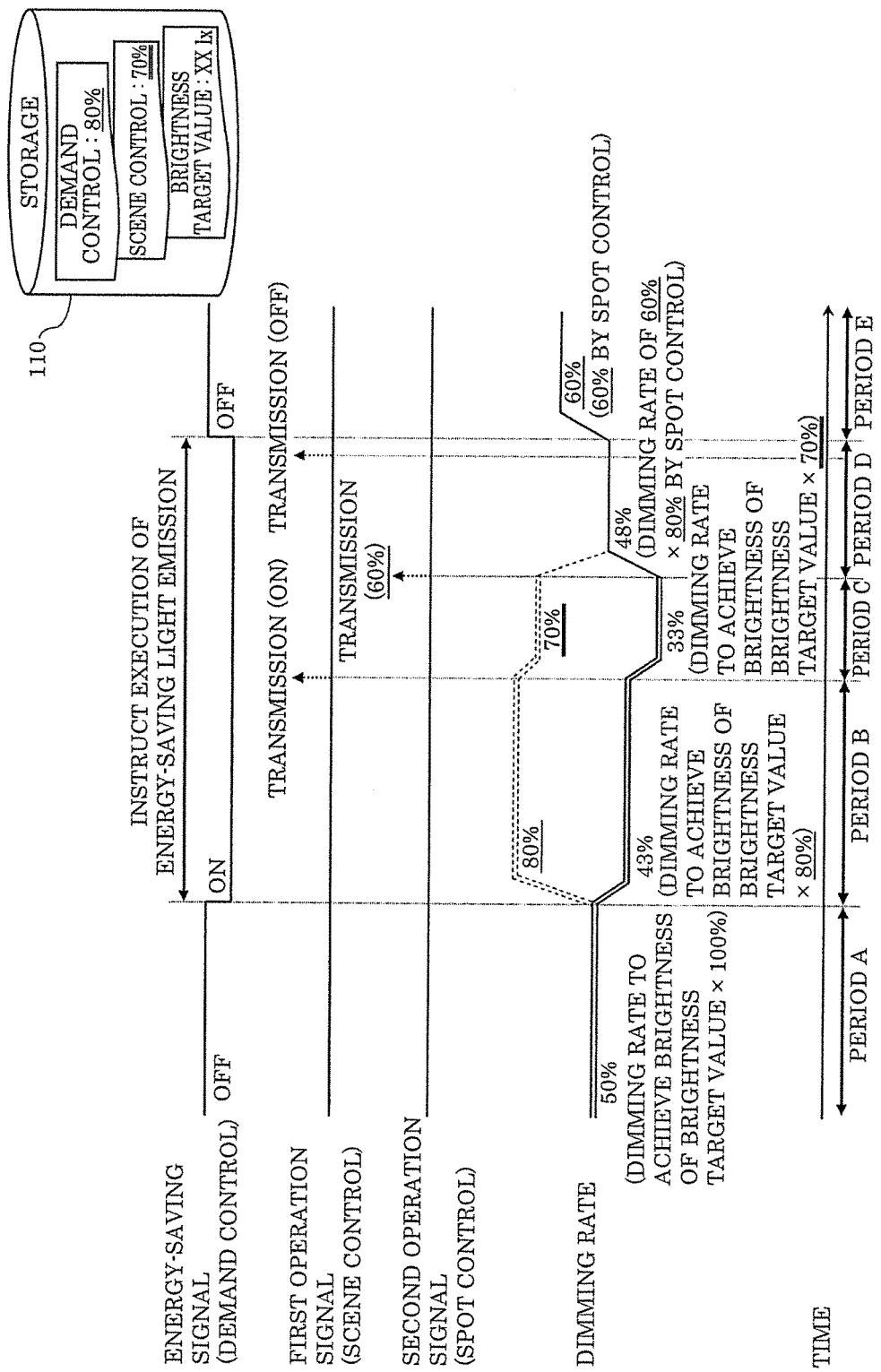
FIG. 4 illustrates the timing at which the dimming rate changes in accordance with signals input into the lighting control device according to the embodiment from an external source.

FIG. 4 illustrates the timing at which the dimming rate changes in accordance with signals input into lighting control device 100 from an external source in a consumer location in which lighting system 10 is installed.

The energy-saving signal, first operation signal and second operation signal illustrated in FIG. 4 are examples of signals input into lighting control device 100 from an external source.

The energy-saving signal is a signal transmitted from demand controller 400, and instructs execution of energy-saving light emission for demand control. Typically, this energy-saving signal is valid throughout the consumer location in which lighting system 10 is installed, and all lighting devices 200 controlled by lighting control device 100 are candidates for reception of the energy-saving signal.

Note that in the following description to be made with reference to FIG. 4, in lighting system 10 configured as described above, the dimming rate set in association with the energy-saving signal is exemplified as being set to 80%. For example, this dimming rate is set as described above by the installer using remote control 300 upon installing lighting system 10, and is stored in storage 110. FIG. 5A illustrates an example of the data structure of the dimming rate stored in storage 110, set in association with the energy-saving signal from demand controller 400.

The first operation signal is a signal transmitted from remote control 300 by, for example, the user operating remote control 300. Similar to demand controller 400, remote control 300 is also a device external to lighting control device 100. Unlike the energy-saving signal, the first operation signal is a signal instructing the dimming rate to be changed in a section of the consumer location, such as a specific room in the consumer location, and is an 8-bit signal indicating a control code for turning on lighting device 200 in a state in which control is set for a predetermined scene, for example. Control for realizing a lighting state specified for this scene (hereinafter also referred to as scene control) may be, for example, registered as one function in remote control 300 and the above-described 8-bit signal may be transmitted to lighting control device 100 by the press of a specified key.

Note that when energy-saving light emission is executed under demand control, in this section, the dimming rate for the scene control is prioritized over the dimming rate instructed in the demand control. In the following description, the dimming rate for this sort of scene control is exemplified as being set at 70%. For example, this dimming rate is also set using remote control 300 and stored in storage 110. FIG. 5B illustrates an example of the data structure of the dimming rate stored in storage 110, set in association with the first operation signal from remote control 300. In the example in FIG. 5B, two settings are registered for scene control. In this way, lighting system 10 may be configured such that a plurality of settings are registered for scene control.

The second operation signal is a signal transmitted from remote control 300 by, for example, the user operating remote control 300. Unlike the energy-saving signal and the first operation signal, the second operation signal is, for example, a signal for controlling the lighting state of each individual lighting device 200 (hereinafter also referred to as spot control), and specifies and instructs a dimming rate. This sort of spot control is executed to cause, for example, only a specified tabletop to be illuminated at a predetermined brightness. Note that when the spot control is executed in a section in which the scene control is being executed, in lighting device 200 under control by the second operation signal, the dimming rate indicated in the spot control is given priority over the dimming rate indicated in the scene control. Moreover, a lighting device 200 that is a candidate for spot control is removed as a candidate for feedback control. In other words, brightness adjustment based on the brightness target value is not performed for such a lighting device 200.

Next, operations performed by lighting control device 100 with respect to the input of the above signals will be described in chronological order. Note that the following description is merely one example; operations performed by lighting control device 100 according to this embodiment and lighting system 10 including lighting control device 100 are not limited to the following example. Moreover, the following dimming rate values are merely examples; operations performed by lighting control device 100 according to this embodiment are not limited to the following values.

First, in period A, which is the first time period, the energy-saving signal that instructs the execution of energy-saving light emission in the consumer location is not being transmitted. Moreover, neither scene control nor spot control is performed. Here, controller 120 in lighting control device 100 executes the above-described feedback control in period A. In other words, controller 120 determines the dimming rate such that the brightness indicated in the brightness information obtained from brightness sensor 130 reaches the brightness target value obtained from storage 110, and transmits, to lighting devices 200 via transmitter 140, a control signal indicating the determined dimming rate. In the example in the drawing, a brightness corresponding to the brightness target value is achieved with a dimming rate of approximately 50% in period A.

Note that in the range indicated by the two lines indicating shifts in dimming rate in FIG. 4, the dimming rate is determined by the feedback control being performed.

Period B following period A starts when controller 120 receives the energy-saving signal transmitted from demand controller 400. The energy-saving signal instructs the execution of energy-saving light emission. While receiving the energy-saving signal, controller 120 accesses storage 110 and obtains the dimming rate associated with the energy-saving signal. In this example, the dimming rate obtained by controller 120 is 80%.

Here, when the dimming rate obtained from storage 110 is applied as-is to lighting devices 200, the dimming rate indicates the shifts indicated by the dashed line in FIG. 4. In this case, the dimming rate in period B is greater than the dimming rate in period A. In other words, lighting devices 200 cannot operate in an energy-saving mode. The same applies to the subsequent period C.

However, with lighting control device 100 according to this embodiment, controller 120 does not apply the above-described dimming rate to lighting devices 200, but rather multiplies the rate indicated by the dimming rate with the brightness target value, and determines an energy-saving brightness target value that is smaller than the brightness target value. Then, controller 120 determines the dimming rate (hereinafter also referred to as the energy-saving dimming rate) for lighting devices 200 based on the energy-saving brightness target value and the successively obtained brightness information. The energy-saving dimming rate used in period B is less than the dimming rate used in period A. Accordingly, in period B, lighting devices 200 can operate in an energy-saving mode. In this example, a brightness corresponding to the original 80% brightness target value is achieved with an energy-saving dimming rate of approximately 43% in period B.

Note that since the energy-saving dimming rate is adjusted so as to cancel out any outside disturbances that may affect the system, such as outside light, in the feedback control by controller 120, even if the brightness target value is reduced to the original 80%, the energy-saving dimming rate does not necessarily become the same 80% with respect to the dimming rate. This is why the energy-saving dimming rate in period B is not the dimming rate of 80% in period A in the example illustrated in FIG. 4.

Period C following period B starts when controller 120 receives the first operation signal for starting the scene control that is transmitted from remote control 300. The dimming rate in period C in FIG. 4 indicates a dimming rate for lighting devices 200 in a section in which the scene control is applied.

As described above, in this section, the dimming rate for the scene control is prioritized over the dimming rate instructed in the demand control. Here, when the 70% dimming rate applied in the scene control is applied as-is to lighting devices 200, the dimming rate indicates the shift indicated by the dashed lines in period C in FIG. 4. In this case, the dimming rate in period C is greater than the dimming rate in period A. In other words, in this case as well, lighting devices 200 cannot operate in an energy-saving mode.

However, with lighting control device 100 according to this embodiment, while receiving the first operation signal via receiver 150, controller 120 does not apply the above-described dimming rate to lighting devices 200 as-is, but rather multiplies the rate indicated by the dimming rate with the original brightness target value, and determines an energy-saving brightness target value that is smaller than this brightness target value. Then, controller 120 determines an energy-saving dimming rate for lighting devices 200 based on the energy-saving brightness target value and the successively obtained brightness information. The energy-saving dimming rate used in period C is less than the dimming rate used in period A. Accordingly, in period C, lighting devices 200 can operate in an energy-saving mode. In this example, a brightness corresponding to the original 70% brightness target value is achieved with an energy-saving dimming rate of approximately 33% in period C.

Note that the reason why the energy-saving dimming rate does not become 70% with respect to the dimming rate even if the dimming rate is reduced to the original brightness target value of 70% in period C is the same reason as described for period B.

Period D following period C starts when controller 120 receives the second operation signal for starting the spot control that is transmitted from remote control 300. Note that the dimming rate in period D in FIG. 4 indicates a dimming rate additionally applied by the spot control to lighting devices 200 in the section to which the dimming rate is applied by the scene control.

As described above, in lighting devices 200 that are candidates for spot control, the dimming rate for the spot control has priority over the dimming rate indicated in the scene control. Moreover, the demand control has priority over the spot control. Hereinafter, an example will be given in which the user operates remote control 300 such that the dimming rate for the candidate lighting devices 200 is 60%.

As described above, lighting devices 200 that are candidates for spot control are removed as candidates for feedback control, and are not controlled based on the brightness target value used in period B or period C. Accordingly, in period D, regardless of the intensity of the outside light, the same dimming rate is applied to lighting devices 200 that are candidates for spot control. More specifically, an energy-saving dimming rate of 48%, determined by multiplying the 80% indicated in demand control by the 60% dimming rate in spot control, is applied to these lighting devices 200. Moreover, even if execution of the scene control is canceled in this state, the dimming rate (energy-saving dimming rate) applied to these lighting devices 200 is not changed.

If the demand control is subsequently canceled, the 60% dimming rate for the spot control is applied to these lighting device 200 (period E in FIG. 4).

(3. Advantageous Effects, Etc.)

In this way, lighting control device 100 according to this embodiment, which controls lighting devices 200, includes brightness sensor 130, storage 110, controller 120, receiver 150, and transmitter 140.

Brightness sensor 130 obtains brightness information indicating the brightness of an illuminated surface. Storage 110 stores a brightness target value for the illuminated surface. Controller 120 receives, from an external source via receiver 150, an energy-saving signal instructing execution of energy-saving light emission by lighting devices 200. Moreover, controller 120 obtains the brightness information from brightness sensor 130 and the brightness target value from storage 110. Moreover, a control signal generated by controller 120 for controlling lighting devices 200 is transmitted to lighting devices 200 via transmitter 140.

Then, when the energy-saving signal for instructing execution of energy-saving light emission by lighting devices 200 is not being received, controller 120 determines a dimming rate for lighting devices 200 based on the brightness target value and the brightness information. Controller 120 generates a control signal indicating the dimming rate determined in the above-described manner, and transmits the control signal to lighting devices 200 via transmitter 140. The control executed as a result of this operation corresponds to the control in period A described above. When the energy-saving signal for instructing execution of energy-saving light emission by lighting devices 200 is being received, controller 120 determines an energy-saving brightness target value that is smaller than the brightness target value by multiplying the brightness target value by a predetermined rate, and determines an energy-saving dimming rate for lighting devices 120 based on the energy-saving brightness target value and the brightness information. In the example described above with reference to FIG. 4, the predetermined rate is 80%, which is set in advance as the dimming rate for execution of energy-saving light emission by the demand control. In the above example, the original brightness target value is multiplied by this 80% rate to decrease the brightness target value.

Controller 120 generates a control signal indicating the determined energy-saving dimming rate, and transmits the control signal to lighting devices 200 via transmitter 140. The control executed as a result of this operation corresponds to the control in period B described above. Controller 120 executes the feedback control, whose control amount is the brightness of lighting devices 200.

The energy-saving signal received from an external source by lighting control device 100 is, for example, a signal transmitted by demand controller 400. When the energy-saving signal for execution of energy-saving light emission by lighting devices 200 is received from demand controller 400, lighting control device 100 does not change the dimming rate to be applied to lighting devices 200 to a dimming rate corresponding to the instruction for execution of energy-saving light emission, but rather uses the energy-saving brightness target value determined by multiplying the brightness target value by a rate (the predetermined rate) of the dimming rate corresponding to the instruction for execution of energy-saving light emission. With this, feedback control and demand control are balanced, and lighting system 10 can operate in the energy-saving mode.

Note that the energy-saving signal instructing execution of the power-saving light-emitting mode is, for example, a dry contact point input, and the energy-saving dimming rate applied to lighting devices 200 when controller 120 is receiving the energy-saving signal is, for example, set using remote control 300 and stored in storage 110.

Moreover, controller 120 may receive, via receiver 150, a first operation signal based on an operation made by the user on an external device to change the brightness of lighting devices 200. Here, the external device is, for example, remote control 300, and the first operation signal is, for example, a signal for the scene control.

When controller 120 receives the first operation signal while receiving the energy-saving signal, controller 120 may further change the energy-saving brightness target value using a rate unrelated to the predetermined rate, and may change the energy-saving dimming rate based on the brightness information and the changed energy-saving brightness target value. Here, the rate unrelated to the predetermined rate is a rate set in advance as the dimming rate for when the scene control is being executed, and in the example above made with reference to FIG. 4, is 70%. In the above example, the energy-saving brightness target value is divided by 80% to obtain the original brightness target value, and the original brightness target value is multiplied by 70% to once again determine the energy-saving brightness target value. Note that when the rate set in advance as the dimming rate for when the scene control is being executed is, for example, 90%, the changed energy-saving brightness target value that is determined increases to a value higher than in period B.

Controller 120 generates a control signal indicating the changed energy-saving dimming rate, and transmits the control signal to lighting devices 200 via transmitter 140.

The control executed as a result of this operation corresponds to the control in period C described above. With this, even when the scene control for applying a partially different lighting state in the consumer location in which energy-saving light emission is being executed by demand control, lighting system 10 can operate in the energy-saving mode.

A lighting control device according to one aspect of the present invention has been described by way of an exemplary, non-limiting embodiment. Those skilled in the art will readily appreciate that many modifications are possible in the exemplary, non-limiting embodiment without materially departing from the inventive concept. Accordingly, all such modifications are intended to be included within the scope of the present invention.

For example, with lighting system 10 described above, lighting control device 100 receives one input system each for the demand control, scene control, and spot control. However, the lighting control device according to the present disclosure is not limited to one input of each of these controls. The lighting control device according to the present disclosure may omit input systems for scene control and spot control, and may include a plurality of input systems for demand control. Hereinafter, an example will be given as a variation of this embodiment of a lighting control device that includes two input systems for demand control.

Embodiment Variation (1. Configuration)

FIG. 6 is a block diagram illustrating an example of the functional configuration of lighting control device 101 according to this variation. The elements included in lighting control device 101 are the same as the elements included in lighting control device 100 and therefore are indicated by like reference signs. Accordingly, detailed description of the elements is omitted.

Lighting control device 101 differs from lighting control device 100 in that in lighting control device 101, receiver 150 receives, from demand controller 400, two input systems for demand control. Hereinafter, an energy-saving signal received by one of these input systems is referred to as a first energy-saving signal, and an energy-saving signal received by the other input system is referred to as a second energy-saving signal.

The first energy-saving signal and the second energy-saving signal are each indifferent from the energy-saving signal described above that is input into lighting control device 100. In other words, each is a dry contact point input signal. Moreover, the dimming rate when controller 120 is receiving the energy-saving signal is set using remote control 300 and stored in storage 110. However, the rate multiplied with the brightness target value when controller 120 is receiving the first energy-saving signal (hereinafter also referred to as the first rate) is set to a different value than the rate multiplied with the brightness target value when controller 120 is receiving the second energy-saving signal (hereinafter also referred to as the second rate).

Moreover, one of the first energy-saving signal and the second energy-saving signal is set to a higher priority than the other. In this example, the second energy-saving signal is set to a higher priority than the first energy-saving signal. In this case, when these two energy-saving signals are received at the same time, controller 120 determines an energy-saving brightness target value by multiplying the brightness target value with the second rate. With this, energy-saving light emission by lighting devices 200 can be executed in a plurality of levels. The priority for the energy-saving signals may be set with remote control 300 by the user or the installer who installs lighting system 10 in the consumer location.

(2. Operations)

Operations for the feedback control system in lighting control device 101 are the same as with lighting control device 100. Moreover, operations performed when a signal other than the energy-saving signal is input while the energy-saving signal is being input are the same. Therefore, description of the control operations performed by lighting control device 101 on these signals is omitted in this variation, and hereinafter, description will focus on control operations performed by lighting control device 101 on the two energy-saving signals input from an external source.

Figure 7:
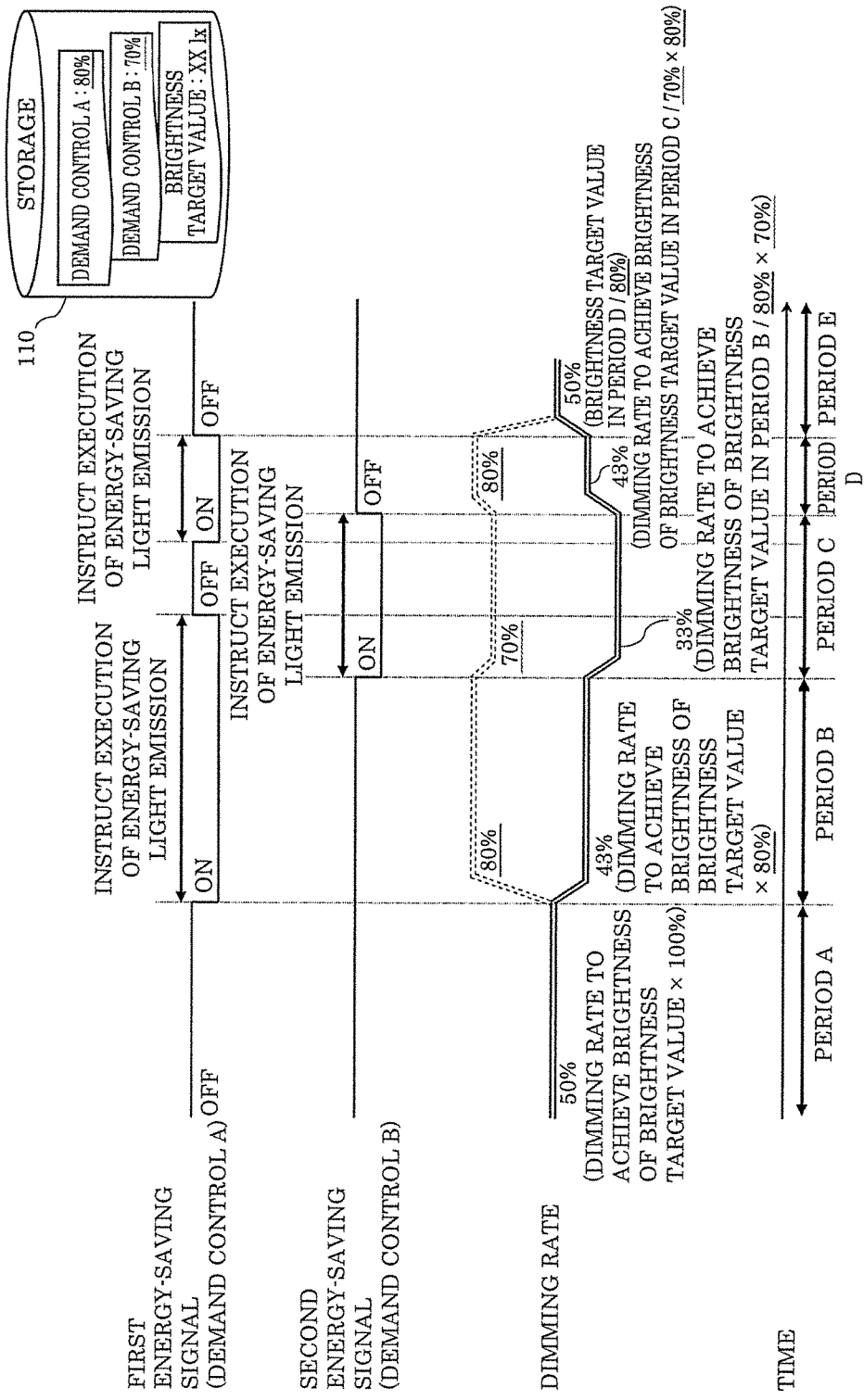
FIG. 7 illustrates the timing at which the dimming rate changes in accordance with signals input into the lighting control device according to the variation of the embodiment from an external source.

FIG. 7 illustrates the timing at which the dimming rate changes in accordance with signals input into lighting control device 101 from an external source.

The first energy-saving signal and the second energy-saving signal illustrated in FIG. 7 are signals input into lighting control device 101 from demand controller 400. Typically, the first energy-saving signal and the second energy-saving signal are each individually valid throughout the consumer location in which lighting system 10 is installed, and all lighting devices 200 controlled by lighting control device 101 are candidates for the energy-saving signals.

Note that in the following description to be made with reference to FIG. 7, in lighting system 10 configured as described above, the dimming rate set in association with the first energy-saving signal is exemplified as being set to 80%, and the dimming rate set in association with the second energy-saving signal is exemplified as being set to 70%. Moreover, the second energy-saving signal is set to a higher priority than the first energy-saving signal. This dimming rate and priority are set by, for example, the installer at the time of installing lighting system 10 using remote control 300 as described above, and is therefore already stored in storage 110. FIG. 8 illustrates an example of the data structure of the dimming rate stored in storage 110, set in association with the energy-saving signal from demand controller 400. In this example, the energy-saving light emission executed when controller 120 is receiving the first energy-saving signal is registered as demand control A, and the energy-saving light emission executed when controller 120 is receiving the second energy-saving signal is registered as demand control B, and the set dimming rate and priority are input in the same rows as the corresponding demand controls.

Next, operations performed by lighting control device 101 with respect to the input of the first energy-saving signal and the second energy-saving signal will be described in chronological order. Note that the following description is merely one example; operations performed by lighting control device 101 according to this variation and lighting system 10 including lighting control device 10a are not limited to the following example. Moreover, the following dimming rate values are merely examples; operations performed by lighting control device 101 according to this variation are not limited to the following values.

First, in period A, which is the first time period, the energy-saving signal that instructs the execution of the energy-saving light emission in the consumer location is not output. Here, controller 120 in lighting control device 101 executes the feedback control described above in the embodiment in period A. In other words, controller 120 determines the dimming rate such that the brightness indicated in the brightness information obtained from brightness sensor 130 reaches the brightness target value obtained from storage 110, and transmits, to lighting devices 200 via transmitter 140, a control signal indicating the determined dimming rate. In the example in the figures, a brightness corresponding to the brightness target value is achieved with a dimming rate of approximately 50% in period A.

Note that, similar to FIG. 4, in the range indicated by the two lines indicating shifts in dimming rate in FIG. 7, the dimming rate is determined by the feedback control being performed.

Period B following period A starts when controller 120 receives the first energy-saving signal transmitted from demand controller 400. While receiving the first energy-saving signal via receiver 150, controller 120 accesses storage 110 and obtains the dimming rate associated with the first energy-saving signal. In this example, the dimming rate obtained by controller 120 is 80%. In this variation as well, controller 120 does not apply the dimming rate obtained from storage 110 to lighting devices 200 as-is, but rather multiplies, as the first rate, the rate indicated by the dimming rate with the brightness target value. Then, controller 120 determines an energy-saving dimming rate for lighting devices 200 based on the energy-saving brightness target value determined by the above multiplication, and the successively obtained brightness information.

Note that the dashed line in the drawing indicates shifts in the dimming rate when the dimming rate obtained from storage 110 is applied as-is to lighting devices 200. In this case, the dimming rate in period B is greater than the dimming rate in period A. In other words, lighting devices 200 cannot operate in an energy-saving mode. The same applies to the subsequent periods C and D.

Period C following period B starts when controller 120 receives the second energy-saving signal transmitted from demand controller 400.

While receiving the second energy-saving signal via receiver 150, controller 120 accesses storage 110 and obtains the dimming rate associated with the second energy-saving signal and the priorities associated with the first energy-saving signal and second energy-saving signal currently being received. As described above, the second energy-saving signal is set to a higher priority than the first energy-saving signal. Having received this information, controller 120 multiplies, as the second rate, a rate indicating the dimming rate (in this example, 70%) associated with the second energy-saving signal with the brightness target value, instead of using the dimming rate associated with the first energy-saving signal. For example, the energy-saving brightness target value determined in period B is divided by 80% to obtain the original brightness target value, and the original brightness target value is multiplied by 70% to once again determine an energy-saving brightness target value. Then, controller 120 determines an energy-saving dimming rate for lighting devices 200 based on the energy-saving brightness target value determined by the above multiplication, and the successively obtained brightness information.

Moreover, since the second energy-saving signal is higher in priority, even if the state of the input of the first energy-saving signal changes in period C, controller 120 does not change the energy-saving brightness target value.

Period D following period C starts when demand controller 400 stops transmission of the second energy-saving signal and controller 120 detects the stopping of the transmission. In period D, as a result of the stopping of the transmission of the second energy-saving signal, controller 120 receives only the first energy-saving signal. While receiving only the first energy-saving signal, controller 120 executes the same control as in period B.

Period E following period D starts when demand controller 400 stops transmission of the first energy-saving signal and controller 120 detects the stopping of the transmission. In period E, as a result of the stopping of the transmission of the first energy-saving signal, controller 120 receives neither of the energy-saving signals. Accordingly, in period E, controller 120 executes the same control as in period A.

(3. Advantageous Effects, etc.)

In this way, in lighting control device 101 according to this variation which controls lighting devices 200, controller 120 receives, as the energy-saving signal, at least one of the first energy-saving signal and the second energy-saving signal at a given time. As the predetermined rate in the above embodiment, a first rate which is used when controller 120 is receiving the first energy-saving signal and is not receiving the second energy-saving signal, and a second rate, different from the first rate, which is used when controller 120 is receiving the second energy-saving signal and is not receiving the first energy-saving signal are set and stored in storage 110. In the above operation example, the first rate is 80% and the second rate is 70%.

With such a configuration in which energy-saving signals are input using a plurality of systems, the energy-saving light emission by lighting devices 200 can be set in a plurality of levels. With this, in lighting system 10, dynamic energy-saving light emission is achieved in accordance with the pace at which power is used in the consumer location or the stringency of the supply of power from the power company. Moreover, for example, one signal may be a signal input based on a comparison of contract power from one consumer location and the current power being used at this consumer location, and the other signal may be a signal input based on whether or not there is a demand for conservation of power via a communication network from the power company.

Moreover, one of the first energy-saving signal and the second energy-saving signal is set to a higher priority than the other. In the above operation example the second energy-saving signal is set to a higher priority than the first energy-saving signal. In this case, when the first energy-saving signal and the second energy-saving signal are received at the same time, controller 120 determines the energy-saving brightness target value by multiplying the brightness target value with the second rate. With this, energy-saving light emission by lighting devices 200 can be executed in a plurality of levels. Moreover, just like with lighting control device 100 according to the above embodiment, in lighting control device 101 according to this variation, feedback control and demand control are balanced, and lighting system 10 can operate in the energy-saving mode.

Other Embodiments, Etc.

Hereinbefore, the lighting control device has been described based on an embodiment and a variation thereof, but the present disclosure is not limited to these examples.

For example, the formats of the signals input into lighting control device 100 from an external source are not limited to the above examples. For example, the first operation signal for the scene control may be a signal resulting from contact input.

Moreover, the method for setting the brightness target value using remote control 300 is not limited to the above example. For example, the brightness (illuminance) value of the illuminated surface input by the user into remote control 300 may be set by being forwarded to lighting control device 100 or 101.

Moreover, candidates for scene control are not limited to lighting devices 200 in one section of the consumer location. For example, lighting devices 200 in a plurality of sections of a consumer location or lighting devices 200 in the entire consumer location may be candidates for scene control.

Moreover, the number of lighting devices 200 that are candidates for spot control is not limited to any given number. Moreover, when the number is two or more, the arrangement of lighting devices 200 is not limited to any particular arrangement.

Furthermore, lighting control device 100 and lighting devices 200 may be connected by wired connection or configured as a single body. In such a case, transmitter 140 which transmits a control signal from controller 120 to lighting devices 200 is unnecessary. Controller 120 directly controls lighting devices 200 based on the determined dimming rate or energy-saving dimming rate.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device that controls a lighting device via feedback control and demand control which is executable in parallel with the feedback control, the lighting control device comprising:
   a brightness sensor that obtains brightness information indicating a current brightness of an illuminated surface illuminated by the lighting device;
   a storage that stores a brightness target value for the illuminated surface;
   a controller that obtains the brightness information from the brightness sensor and the brightness target value from the storage;
   a receiver via which the controller receives, from an external source, an energy-saving signal instructing execution of energy-saving light emission by the lighting device, for the demand control of the lighting device; and
   a transmitter that transmits, to the lighting device, a control signal generated by the controller for controlling the lighting device, wherein:
   when the energy-saving signal is not being received, to execute the feedback control, the controller repeatedly and continuously determines a dimming rate for the lighting device based on the brightness target value obtained from the storage and the brightness information, and transmits, to the lighting device via the transmitter, the control signal indicating the dimming rate, and
   when the energy-saving signal is being received, to execute the demand control, the controller determines an energy-saving brightness target value by multiplying the brightness target value obtained from the storage by a predetermined rate and repeatedly and continuously determines an energy-saving dimming rate for the lighting device based on the energy-saving brightness target value and the brightness information, the energy-saving brightness target value being smaller than the brightness target value obtained from the storage, and transmits, to the lighting device via the transmitter, the control signal indicating the energy-saving dimming rate.

2. The lighting control device according to claim 1, wherein:
   the controller receives, as the energy-saving signal, at least one of a first energy-saving signal and a second energy-saving signal, and
   a first rate is set and stored in the storage as the predetermined rate for a case where the controller is receiving the first energy-saving signal and is not receiving the second energy-saving signal, and a second rate, different from the first rate, is set and stored in the storage as the predetermined rate for a case where the controller is receiving the second energy-saving signal and is not receiving the first energy-saving signal.

3. The lighting control device according to claim 2, wherein:
   the second energy-saving signal is set to a higher priority than the first energy-saving signal, and
   when the controller is receiving the first energy-saving signal and the second energy-saving signal at a same time, the controller determines the energy-saving brightness target value by multiplying the brightness target value by the second rate.

4. The lighting control device according to claim 3, wherein
   the second energy-saving signal is set to the higher priority than the first energy-saving signal using a remote control.

5. The lighting control device according to claim 1, wherein
   the predetermined rate is set using a remote control and stored in the storage.

6. The lighting control device according to claim 1, wherein:
   the controller receives, from an external device via the receiver, a first operation signal based on an operation made by a user on the external device to change a brightness of the lighting device, and
   upon receiving the first operation signal while receiving the energy-saving signal, the controller:
   changes the energy-saving brightness target value using a third rate unrelated to the predetermined rate;
   changes the energy-saving dimming rate based on the changed energy-saving brightness target value and the brightness information, and
   transmits, to the lighting device via the transmitter, the control signal indicating the changed energy-saving dimming rate.

7. A lighting control device that controls a lighting device via feedback control and demand control which is executable in parallel with the feedback control, the lighting control device comprising:
   a brightness sensor that obtains brightness information indicating a current brightness of an illuminated surface illuminated by the lighting device;
   a storage that stores a brightness target value for the illuminated surface;
   a controller communicably coupled to the brightness sensor and the storage; and
   a receiver via which the controller receives, from an external source, an energy-saving signal instructing execution of energy-saving light emission by the lighting device, for the demand control of the lighting device, wherein:
   when the energy-saving signal is not being received from the external source, to execute the feedback control, the controller repeatedly and continuously determines a dimming rate for the lighting device based on the brightness target value and the brightness information, and controls the lighting device based on the dimming rate, and
   when the energy-saving signal is being received from the external source, to execute the demand control, the controller determines an energy-saving brightness target value by multiplying the brightness target value obtained from the storage by a predetermined rate, repeatedly and continuously determines an energy-saving dimming rate for the lighting device based on the energy-saving brightness target value and the brightness information, and controls the lighting device based on the energy-saving dimming rate, the energy-saving brightness target value being smaller than the brightness target value obtained from the storage.

8. The lighting control device according to claim 1, wherein the predetermined rate is a positive value less than 1.

* * * * *